US008499199B2

(12) United States Patent
Johnson et al.

(10) Patent No.: US 8,499,199 B2
(45) Date of Patent: Jul. 30, 2013

(54) GPU COMPUTATIONAL ASSIST FOR DRIVE MEDIA WAVEFORM GENERATION OF MEDIA EMULATORS

(75) Inventors: Joshua Alan Johnson, Rochester, MN (US); Robert W. Warren, Jr., Loveland, CO (US); Kyle L. Nelson, Rochester, MN (US)

(73) Assignee: LSI Corporation, San Jose, CA (US)

( * ) Notice: Subject to any disclaimer, the term of this patent is extended or adjusted under 35 U.S.C. 154(b) by 517 days.

(21) Appl. No.: 12/877,842

(22) Filed: Sep. 8, 2010

(65) Prior Publication Data

US 2012/0060059 A1    Mar. 8, 2012

(51) Int. Cl.
   *G06F 11/00*    (2006.01)

(52) U.S. Cl.
   USPC ............... 714/44; 714/25; 714/6.1; 714/6.11

(58) Field of Classification Search
   USPC ..................................................... 714/25, 44
   See application file for complete search history.

(56) References Cited

U.S. PATENT DOCUMENTS

| | | | |
|---|---|---|---|
| 5,541,862 | A | 7/1996 | Bright et al. |
| 5,951,704 | A | 9/1999 | Sauer et al. |
| 6,370,658 | B2 | 4/2002 | Jeong |
| 6,397,173 | B1 | 5/2002 | Campbell et al. |
| 7,558,428 | B2 | 7/2009 | Shen et al. |
| 2008/0109810 | A1 | 5/2008 | Pronovost et al. |
| 2008/0177519 | A1 | 7/2008 | Miller et al. |
| 2008/0263253 | A1* | 10/2008 | Sedeh et al. ................. 710/308 |
| 2009/0006073 | A1 | 1/2009 | Mahr et al. |

OTHER PUBLICATIONS

Browne, Jack, Software Sculpts Complex Waveform, Planet EE Network, Penton Media, Inc., Sep. 2003.
Amada, Takashi, et al., Particle-Based Fluid Simulation on GPU, Nara Institute of Science and Technology, 2003; found at http://www.cse.ohio-state.edu/~eisenmaj/788/sphPapers/amada03.pdf, Jun. 2010.

* cited by examiner

*Primary Examiner* — Sarai Butler
(74) *Attorney, Agent, or Firm* — Christopher P. Whitham; Cochran Freund & Young LLC

(57) ABSTRACT

Disclosed is a method and apparatus for testing devices that will be connected to a computer storage media device by generating a complex test waveform that emulates operation of the computer storage media device using at least one Graphics Processing Unit (GPU) and applying the generated complex test waveform to the device(s) being tested. The complex test waveform may be generated by calculating a plurality of discrete individual portions of the complex test waveform in parallel, in real-time, and continuously using the parallel processing features of the GPU(s). The discrete individual portions of the complex test waveform may be representative of various characteristics of the emulated computer storage media device operation such as operational characteristics of the computer storage media device, environmental effects on the computer storage media device, application of filters to the computer storage media device signal, etc. Various embodiments may generate the base data signal waveform from the emulated computer storage device such that the entire complex test waveform is calculated. Other embodiments may use a pre-existing base data signal waveform provided from another source and modify/alter the pre-existing base data signal waveform to generate the complex test waveform. When available, one or more Central Processing Units (CPUs) and/or CPU cores may also perform calculations in parallel with the calculations performed by the GPU(s).

20 Claims, 5 Drawing Sheets

GPU COMPUTATIONAL ASSIST FOR DRIVE MEDIA WAVEFORM GENERATION OF MEDIA EMULATORS

BACKGROUND OF THE INVENTION

As computer technology has advanced through the years, access to computer readable data storage has been an important feature to permit computer systems to store data and applications for use by the computer system. Two common computer readable storage mediums are rotating computer storage media, such as Hard Disk Drives (HDDs) and, more recently developed, Solid State Media Disks (SSDs), which, either singly or together, are an integral part of a typical modern computer system. Often, the data and applications stored on a computer storage media device have a much larger financial value than the financial cost of the computer system equipment itself. Thus, a failure of the computer storage media device may cause much more financial harm than complete failure of the remainder of the computer system. A malfunction in the computer storage media controller and/or other computer storage media circuitry/subsystems may appear as a failure of the actual rotating magnetic media of an HDD or the memory chips of an SSD. Malfunctions in other equipment that interacts with the computer storage media device prior to delivery of data to a final destination may also appear as a failure of the actual computer storage media device. Further, the computer storage media controller and/or other computer storage media circuitry/subsystems, as well as other devices that may interact with the computer storage media device, may also be able to correct for some errors encountered by the computer storage media device prior to the signal from the computer storage media device reaching the controller, circuit, subsystem, external device, etc. Thus, to ensure the maximum reliability of computer storage media, from the perspective of a typical user, it is important to ensure that not only is the actual media as reliable as possible (i.e., the rotating magnetic media of an HDD and the memory chips of an SSD), but that other ancillary devices are also as reliable as possible (i.e., the computer storage media controller and/or other computer storage media circuitry, as well as any other devices that may interact with the computer storage media device).

SUMMARY OF THE INVENTION

An embodiment of the present invention may comprise a method to test, in real-time, at least one test device that is a device intended to interact with a computer storage media device comprising: calculating, in real-time and continuously, a plurality of discrete individual portions of a complex test waveform using parallel processing features of at least one Graphics Processing Unit (GPU) such that each discrete individual portion of the plurality of discrete individual portions is calculated in parallel by the at least one GPU, each calculation of each discrete individual portion of the plurality of individual portions being based on a calculable algorithm that defines a representation of an effect on a data signal delivered by the computer storage media device; combining the plurality of calculated discrete individual portions of the complex test waveform together to generate a complete complex test waveform that emulates operation of the computer storage media in real-time, continuously, and using the parallel processing features of the at least one GPU; and applying, in real-time and continuously, the complete complex test waveform to the at least one test device in order to test operation of the at least one test device when the at least one test device interacts with the complete complex test waveform that emulates the computer storage media device.

An embodiment of the present invention may further comprise a test apparatus for testing, in real-time, at least one device that is intended to interact with a computer storage media device comprising: at least one Graphics Processing Unit (GPU) that has parallel processing features; a calculation subsystem that calculates, in real-time and continuously, a plurality of discrete individual portions of a complex test waveform using the parallel processing features of the at least one GPU such that each discrete individual portion of the plurality of discrete individual portions is calculated in parallel by the at least one GPU, each calculation of each discrete individual portion of the plurality of individual portions being based on a calculable algorithm that defines a representation of an effect on a data signal delivered by the computer storage media device; a complex test waveform generation subsystem that combines the plurality of calculated discrete individual portions of the complex test waveform together to generate a complete complex test waveform that emulates operation of the computer storage media in real-time, continuously, and using the parallel processing features of the at least one GPU; and a complex test waveform output that outputs the complete complex test waveform for application, in real-time and continuously, to the at least one test device in order to test operation of the at least one test device when the at least one test device interacts with the complete complex test waveform that emulates the computer storage media device.

An embodiment of the present invention may further comprise a test apparatus for testing, in real-time, at least one device that is intended to interact with a computer storage media device comprising: means for calculating, in real-time and continuously, a plurality of discrete individual portions of a complex test waveform using parallel processing features of at least one Graphics Processing Unit (GPU) such that each discrete individual portion of the plurality of discrete individual portions is calculated in parallel by the at least one GPU, each calculation of each discrete individual portion of the plurality of individual portions being based on a calculable algorithm that defines a representation of an effect on a data signal delivered by the computer storage media device; means for combining the plurality of calculated discrete individual portions of the complex test waveform together to generate a complete complex test waveform that emulates operation of the computer storage media in real-time, continuously, and using the parallel processing features of the at least one GPU; and means for applying, in real-time and continuously, the complete complex test waveform to the at least one test device in order to test operation of the at least one test device when the at least one test device interacts with the complete complex test waveform that emulates the computer storage media device.

DETAILED DESCRIPTION OF THE EMBODIMENTS

Figure 1:
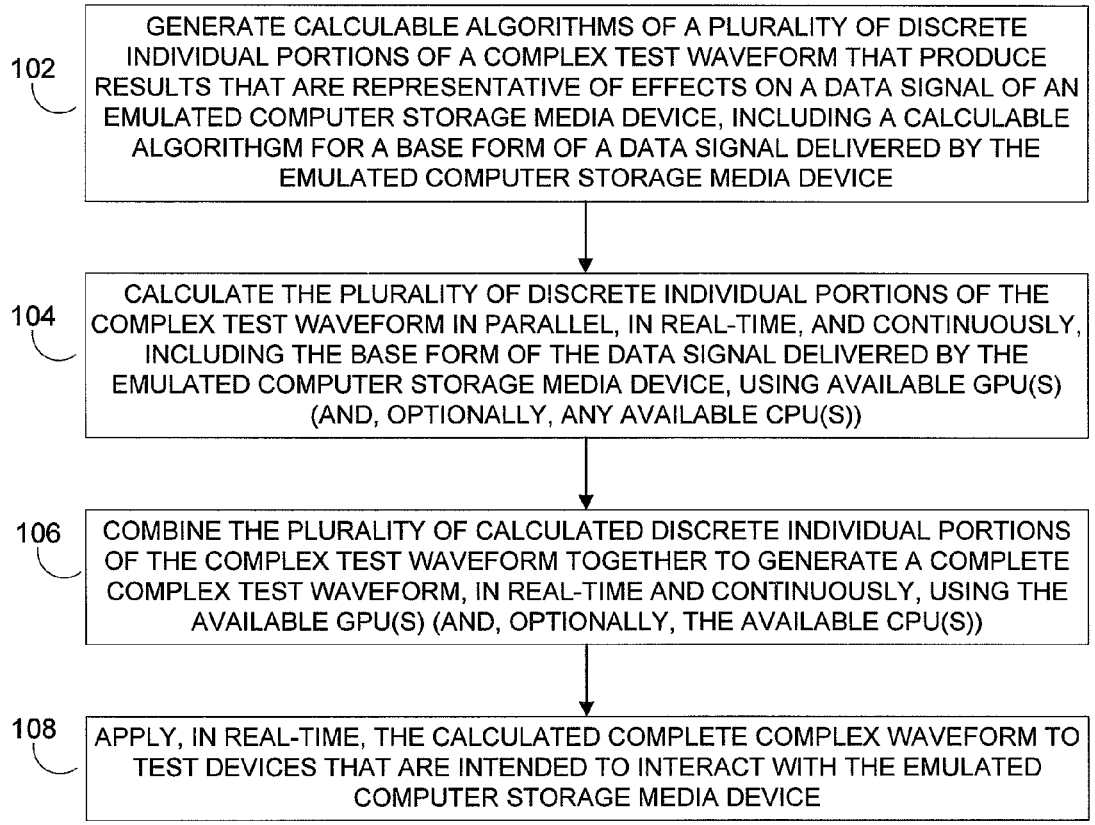
FIG. 1 is a flow chart of the operation of an embodiment to test devices that are intended to be connected to a computer media storage device using a complex test waveform having a calculated base data signal that emulates the computer storage media device.

Data and applications stored on computer storage media are often some of the most important and financially valuable possessions of a computer user. Two common computer readable storage mediums are rotating magnetic computer storage media such as Hard Disk Drives (HDDs) and, more recently, Solid State Media Disks (SSDs) based on flash memory or some other type of non-volatile memory. Other types of computer storage media devices may currently be available or may become available in the future. In general, the various types of computer storage media devices interact with a storage media controller and/or other circuitry of the computer storage media device in a similar fashion. Likewise, interactions of the computer storage media device with any other devices that may be operating in conjunction with the computer storage media device, including external devices, may also be characterized in a similar fashion. The similarity of interactions between controllers, subsystems, and other devices and the various types of raw computer storage media devices (e.g., HDDs, SDDs, etc.) comes about since, in the end, the storage and retrieval of data is a common feature of all the various types of computer storage media devices.

Improper function of the computer storage media controller and/or other computer storage media circuitry, as well as other devices that may interact with the computer storage media device, may appear to a user as a failure of the actual computer storage media device at the heart of the storage mechanism and not a failure of ancillary controllers, subsystems, external devices, etc. Accordingly, the importance of testing the controller and data access devices, subsystems, equipment, etc. that interact with the actual computer storage media (such as the rotating magnetic platters of HDDs or the flash memory of SSDs) is important in order to ensure that the equipment interacting with the computer storage media operates correctly. Generally, to properly test the controller and data access devices, subsystems, equipment, etc. that interact with the computer storage media, it is necessary to have signals/waveforms that are representative of the computer storage media operation for use during the development, debugging, verification, and validation of the controller and data access devices, subsystems, equipment, etc. that interact with the computer storage media. Providing various representative signals/waveforms as the signal/waveform would appear at various locations in the signal path may also be useful in testing. Some locations that may be useful for emulation of representative waveforms include, but are not limited to: raw data as read at the actual computer storage media (i.e., at the head for a rotating magnetic HDD or at the output of the memory chips for an SSD), at the input to a pre-amplifier, at the output of the pre-amplifier, at the input to a controller subsystem, at the output of the controller subsystem, and at the final delivery point. It is desirable to have as much control over the representative waveforms as possible so that the full range of potential signals/waveforms that may be produced by a computer storage media device may be generated at will and used to perform the most extensive testing possible of the controller and data access devices, subsystems, equipment, etc. that interact with the computer storage media device.

A computer storage media emulator apparatus that provides signals/waveforms that emulate operation of the computer storage media device may be used to provide the necessary signals/waveforms to test the controller and data access devices, subsystems, equipment, etc. that interact with the computer storage media. Generation/computation of the representative signals/waveforms that emulate operation of a real the computer storage media device may be a very computation intensive task, and may also be require a lot of "bandwidth" (i.e., being able to move large amounts of data). A full representative waveform that encompasses the entire storage capacity of a computer storage medium are typically very large, at approximately eight to ten times the size of the capacity of the computer storage media. For typical computer storage media available today, the full representative waveform may be tens of terabytes or larger. Sequentially processing the large amount of data needed to fully represent a waveform from a computer storage media device is not practical for use in the design, test, and or validation of the controller and data access devices, subsystems, equipment, etc. that interact with the computer storage media. Since the computation of a waveform that is representative of operation of a real computer storage device may take too long and consume too much bandwidth, a testing system may use simplified or idealized waveforms instead of the desired waveforms that are truly representative of actual computer storage media operation. Further, due to the large amount of data contained in the simulated waveforms, short samples, or snippets, of waveforms may be used instead of a full, continuous representation of the simulated signal/waveform that more accurately emulates operation of the computer storage media device.

Generation of a full waveform that emulates operation of a computer storage media device typically utilizes large vectors of integer data with many simple mathematical operations performed on each element of the vectors, such as simple addition. Each element of the very large vector may be considered a discrete individual portion of the full/complete waveform such that a plurality of discrete individual portions (i.e., vector elements) may be computed and combined to make/generate the full/complete waveform. Calculation of the plurality of discrete individual portions of the full/complete waveform may be performed efficiently using parallel processing. Accordingly, an embodiment may provide a full, continuous representation, in real-time (aka. at-speed) of a complete complex waveform that accurately represents the actual operation of a computer storage media device by applying the processing power and parallel processing features of one or more Graphics Processing Units (GPUs). Optionally, to add to the processing power available from the one or more GPUs, the one or more GPUs may also work in conjunction with one or more Central Processing Units (CPUs), if available, to enhance and accelerate the process of generating the complex waveform (i.e., complex test waveform). The complex test waveform generated may then be used to test the controller and data access devices, subsystems, equipment, etc. that interact with the computer storage media. For an embodiment, real-time performance represents that the complex test waveform is available while the complete complex waveform is calculated and that the calculations are performed at a speed that permits the waveform to remain available while the calculations are performed. That is, the calculations to generate the complete complex waveform are performed at least as fast as the complete complex waveform is delivered. Similarly, for an embodiment, continuous performance represents that the complete complex test waveform is available continuously from the time the complete complex waveform is requested to be delivered until the time it is requested that the complete complex waveform be stopped. Thus, an embodiment does not require that short sections ("snippets") of a waveform be stored and then delivered in short bursts. For an embodiment, a full/complete complex waveform represents that the waveform generated is a reasonably accurate approximation of the actual signal waveform including real world effects on the waveform and not a simplified or ideal representation of the waveform that may not convey many of the idiosyncrasies of a real world waveform, and/or, that the waveform is capable of representing data of the entire storage capacity of the emulated computer storage device.

FIG. 1 is a flow chart 100 of the operation of an embodiment to test devices that are intended to be connected to a computer media storage device using a complex test waveform having a calculated base data signal that emulates the computer storage media device. At step 102, calculable algorithms are generated for each of a plurality of discrete individual portions of a complex test waveform. Each calculable algorithm, when calculated, may produce a result that is representative of an effect on a data signal of a computer storage media device during transmission of the data signal from the computer storage media device and the desired physical location along the signal path where the data signal is being emulated. In the embodiment shown in FIG. 1, at least one discrete individual portion of the plurality of discrete individual portions of the complex test waveform is representative of the base form of the data signal from the computer storage media device. In other words, at least one discrete individual portion of the plurality of discrete individual portions of the complex test waveform represents the rawest form of the data signal as the data signal is read directly at the actual storage location of the computer storage media device (e.g., the data signal as the data signal appears at the head of an HDD). Other embodiments may use a pre-existing base data signal waveform and modify the pre-existing base data waveform with the plurality of discrete individual portions of the complex test waveform (see, for example the disclosure with respect to FIG. 2 below).

At step 104, one or more Graphics Processing Units (GPUs) are used to calculate the plurality of discrete individual portions of the complex test waveform. The one or more GPUs calculate each discrete individual portion of the plurality of discrete individual portions of the complex test waveform according to the calculable algorithm corresponding to each discrete individual portion. The calculations of the discrete individual portions are performed in parallel using the parallel processing features/capabilities of typical GPUs such that the calculations may be performed in real-time (aka. "at-speed") and continuously. Further, if additional processing resources, such as one or more Central Processing Units (CPUs), are available, the additional resources (e.g., the CPUs) may be used to perform some of the calculations of the plurality of discrete individual portions of the complex test waveform to permit additional/faster calculations than may be available with through use of just the available GPUs. One skilled in the art will recognize that a CPU with multiple cores may operate similar to multiple CPUs with each core acting as a CPU. Therefore, when referring to one or more CPUs, a CPU core may be considered to be the operating equivalent of a CPU for purposes of the calculations of the plurality of discrete independent portions of the complex test waveform. In the embodiment shown in FIG. 1, the calculations of the plurality of discrete individual portions of the complex test waveform include a calculation of the base form (i.e., raw form) of the data signal from the emulated computer storage media device. Thus, in the embodiment shown in FIG. 1, the entire complex test waveform is generated by the applicable compute resources (i.e., GPUs and, optionally, CPUs or other available computation resources).

At step 106, the plurality of calculated (from step 104 above) discrete individual portions of the complex test waveform are combined together in order to generate a complete complex test waveform that incorporates all of the characteristics, aspects, features, etc. of the plurality of discrete individual portions of the complex test waveform. As with the calculation of the plurality of discrete individual portions of the complex test waveform, the combination of the plurality of calculated discrete individual portions of the complex test waveform is performed in parallel, in real-time, and continuously by the GPUs using the parallel processing features available on typical GPUs. Again any additional available compute resources, such as CPUs, may also be used to enhance the available parallel processing of the GPUs, with the computer resources being assigned calculable algorithms as may best suit the particular calculation at hand (see also the disclosure with respect to FIGS. 3 and 4 below).

At step 108, the complete complex test waveform from step 106 is applied to one or more test devices. The one or more test devices may include any internal or external device, subsystem, circuit, etc. that is intended to interact with the emulated computer media device. The real-time, continuous, complete complex test waveform permits the one or more test devices to be tested in real-time and continuously using an emulated waveform of the operation of the computer storage media device that closely represents the actual operation of the computer storage media device. Thus, the test devices may be tested in situations that closely approximate actual operating conditions (i.e., not simplified or ideal conditions) without the need to have the actual computer storage media device present. Further, as the complete complex test waveform is generated, the test devices may be tested against a variety of different computer storage media devices by changing the plurality of discrete individual portions of the complex test waveform to emulate a different computer storage media device.

Further, various "effects" on the emulated complex test waveform may be added, subtracted, and/or modified at runtime to permit a user to test various scenarios, including scenarios that may be difficult to recreate with the actual computer storage media device being emulated. An embodiment may provide access to adjustable parameters that, when modified, change the output of a calculable algorithm. One simple parameter may be an on/off switch that permits a user to add or remove the effects (i.e., contribution) of a particular discrete individual portion on the resulting complete complex test waveform. One skilled in the art will recognize that an embodiment that completely adds or subtracts a discrete individual portion to or from the overall calculation of the complete complex test waveform may be equivalent to a parameter that turns the calculation of a discrete individual portion of the complex test waveform on and off. Other parameters may provide data variables that modify the results of a calculable algorithm and/or may provide switches that turn different features of a calculable algorithm on and off as indicated by the value of the particular parameter being adjusted. Some example parameters may include, but are not limited to: on/off, environmental effects, head fly height of a rotating computer storage media device, servo wedge characteristics of a rotating computer storage media device, a parameter associated with a rotating computer storage media device, a parameter associated with a flash memory computer storage media device, a parameter associated with a Hard Disk Drive (HDD) computer storage media device, a parameter associated with a Solid State Drive (SSD) computer storage media device, and other parameters that may provide desirable modifications to a calculable algorithm. Parameters may be adjusted manually or automatically. An embodiment may automatically change values of one or more parameters to permit a broader range of changes to the complete complex test waveform that, in turn, permits a broader range of testing for the test devices being tested with the complete complex test waveform. An embodiment that automatically adjusts at least one parameter may adjust the parameter in arbitrarily and/or randomly to permit testing of unpredictable changes in the complex test waveform. The automatic updates to calculable algorithm parameters may further be used to perform "Monte Carlo" type testing within a particular available range of a parameter. Alternatively, an embodiment may incorporate the addition, subtraction, and/or modification of the various effects on the emulated complex test waveform described by the use of parameters directly into the calculable algorithm that calculates each discrete individual portion of the plurality of discrete individual portions that generate the complete complex test waveform. Placing automatic parameter updates in the code of the calculable algorithms may be particularly applicable if all parameters are intended to be automatically adjusted.

Each discrete individual portion of the plurality of discrete individual portions that make up the complete complex test waveform may be representative of a contribution to (i.e., effect on) the complete complex test waveform. For instance, contributions from a servo and/or user data sectors of rotating magnetic media (e.g., HDD) may each be incorporated into the complete complex test waveform by including one or more discrete individual portions representative of the servo and/or user data sector contributions to the complex test waveform. Similarly, other contributions from other sources may be included using additional discrete individual portions, such as contributions for environmental effects, other circuitry/hardware operation on the computer storage media device, malfunctions of systems/subsystems of the computer storage media device, signal loss, or other characteristics of a complete complex test waveform that may be defined by calculable algorithms. Advantageously, the contributions for each discrete individual portion of the plurality of discrete individual portions of the complex test waveform do not have to be continuous signals (i.e., each discrete individual portion may represent either a continuous or a non-continuous contribution to the complete complex test waveform). Consequently, instead of one continuous stream of waveform data, the data may be divided into discrete portions of a signal, such as the servo and user data sectors of the rotating magnetic media of a HDD described above. Thus, at a coarse level, an embodiment may generate each discrete individual portion of the plurality of discrete individual portions of the complex test waveform in parallel using the parallel processing features of one or more GPUs and combine the plurality of discrete individual portions together to generate the complete complex test waveform also using the parallel processing features of the GPUs. Examples of continuous discrete individual portions of a complex test waveform may include, but are not limited to: a raw analog form of a digital signal read directly from the computer storage media device, repetitive environmental effects, and other continuously repetitive phenomena. Examples of non-continuous discrete individual portions of a complex test waveform may include, but are not limited to: a one-time environmental effect, a non-periodic environmental effect, other one-time effects, other non-periodic effects, Inter-Symbol Interference (IS) effects, media defect effects, and/or non-repetitive access of user data sectors.

Each discrete individual portion of the plurality of discrete individual portions of the complex test waveform may be calculated using a calculable algorithm that provides an output that is representative of the contribution of the corresponding discrete individual portion of the complex test waveform. Some calculable algorithms may simply apply a filter, such as a high-pass, low-pass, or band-pass filter to the complex test waveform to emulate common issues encountered by a real world signal. The calculable algorithm necessarily is an algorithm that may be calculated/computed by the parallel processing features of the one or more GPUs (or the optionally available one or more CPUs). Examples of types of calculable algorithms include, but are not limited to: an Arbitrary Waveform Generation (AWG) algorithm, a transform algorithm, a lookup table algorithm, an analog signal generation algorithm, digital signal generation algorithm, a filter algorithm, and a mathematical function algorithm.

Since the complex test waveform is calculated as a combination of the contributions of different discrete individual portions, the complex test waveform may be configured to emulate the waveform delivered by a computer storage media device at any location along the signal path of the data signal delivered by the emulated computer storage media device. Since different controllers and subsystems, as well as other devices, may require testing, it is beneficial to be able to emulate the state of the signal from the computer storage media device at the location in the signal path where the device/controller being tested will be located. With the of the addition and subtraction of the various contributions to the complete complex test waveform by adding or removing various discrete individual portions from the generation of the complete complex test waveform, changing the location on the signal path of the emulated complex test waveform is easy to achieve. Examples of locations along the signal path where the generated complex test waveform may emulate operation of the computer storage media device operation may include, but are not limited to: raw data as read at the computer storage media device, raw data as read at a head of a rotating magnetic HDD computer storage device, raw data as read at an output of memory chips of a SSD computer storage device, at an input to a pre-amplifier, at the output of the pre-amplifier, at an input to a controller subsystem of the computer storage media device, and at an output of the controller subsystem of the computer storage media device, and at a final delivery point of the data delivered by the computer storage media device. Examples of devices that may be tested with the generated complete complex test wave form may include, but are not limited to: the computer storage device controller, the computer storage device writer, the computer storage device reader, computer storage device functional blocks/subsystems, an external device interacting with the computer storage device, and a subsystem of said external device interacting with said computer storage device.

An embodiment may be implemented using a computer system having one or more GPUs (see also the disclosure with respect to FIG. 5 below). To simplify programming of an embodiment, a designer may enhance an embodiment by using GPU vendor supplied software libraries, such as the software libraries provided by NVIDIA Corporation and ATI Technologies, Inc. A designer of an embodiment may also use Application Programming Interface (API) standards, such as the OpenCL standard published by the Khronos Group, to enhance an embodiment, either alone or in addition to the vendor supplied software libraries. While significantly more difficult, a designer may also create all necessary programming without any third party tools for assistance. In conjunction with any third party tools used for implementation (i.e., vendor supplied software libraries and/or standard APIs), a designer of an embodiment will also create the custom programming necessary to implement the calculable algorithms for each discrete individual portion of the plurality of discrete individual portions that are necessary to generate waveforms that are representative of signals that would be read/delivered from a computer storage media device. A designer may also create a library of calculable algorithms so that future implementations that desire a similar functionality may use the library of calculable algorithms rather than being required to create a new calculable algorithm. The programming APIs and software libraries may also assist with scheduling the algorithmic processing on the appropriate compute resource, whether the compute resource is on a GPU or, optionally, on an CPU. One embodiment may encode the processing element for calculations into the calculable algorithms providing a predefined assignment list for which processor on a GPU and/or which CPU will perform a calculation (see also the disclosure with respect to FIG. 3 below). Another embodiment may use a heuristic algorithm to compare processing speed and efficiency for the various calculations of the calculable algorithms and select between processors on the GPUs and any available CPUs based on the heuristic comparison (see also the disclosure with respect to FIG. 4 below). Using a heuristic algorithm to select processors for calculations does not require that the number and/or type of processing elements be known in advance and/or coded into the calculable algorithms. Thus, for the heuristic processor selection, the number and type of processing elements may be adjusted based on the amount of actual work, generation, and/or transformation necessary for real-time waveform generation and output.

Figure 2:
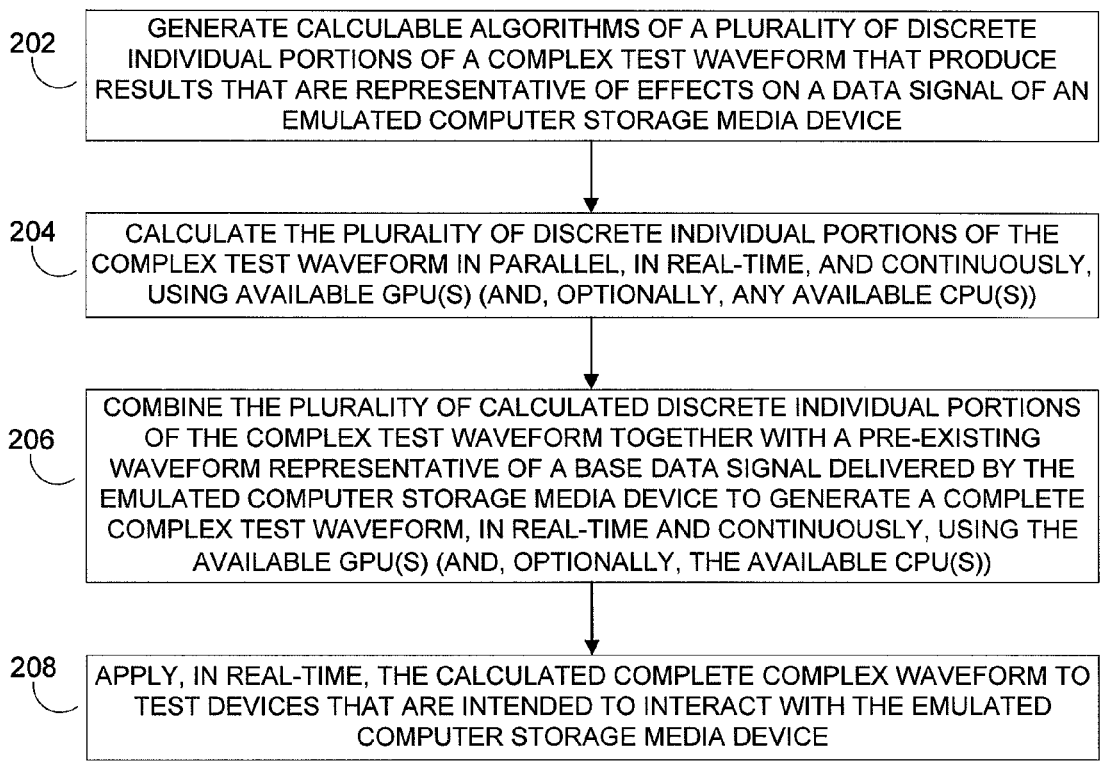
FIG. 2 is a flow chart of the operation of an embodiment to test devices that are intended to be connected to a computer media storage device using a complex test waveform having a pre-existing base data signal that emulates the computer storage media device.

FIG. 2 is a flow chart 200 of the operation of an embodiment to test devices that are intended to be connected to a computer media storage device using a complex test waveform having a pre-existing base data signal that emulates the computer storage media device. At step 202, calculable algorithms are generated for each of a plurality of discrete individual portions of a complex test waveform. Each calculable algorithm, when calculated, may produce a result that is representative of an effect on a data signal of a computer storage media device during transmission of the data signal from the computer storage media device and the desired physical location along the signal path where the data signal is being emulated. In the embodiment shown in FIG. 2, a pre-existing waveform that is representative of the base form of the data signal from the computer storage media device is provided for later modification/alteration to properly and completely emulate the signal delivered by a computer storage media device. Other embodiments may generate a base data signal waveform using at least one discrete individual portion of the plurality of discrete individual portions of the complex test waveform (see, for example the disclosure with respect to FIG. 1 above).

At step 204, one or more Graphics Processing Units (GPUs) are used to calculate the plurality of discrete individual portions of the complex test waveform used to modify/alter the pre-existing base data waveform. The one or more GPUs calculate each discrete individual portion of the plurality of discrete individual portions of the complex test waveform according to the calculable algorithm corresponding to each discrete individual portion. The calculations of the discrete individual portions are performed in parallel using the parallel processing features/capabilities of typical GPUs such that the calculations may be performed in real-time (aka. "at-speed") and continuously. Further, if additional processing resources, such as one or more Central Processing Units (CPUs), are available, the additional resources (e.g., the CPUs) may be used to perform some of the calculations of the plurality of discrete individual portions of the complex test waveform to permit additional/faster calculations than may be available with through use of just the available GPUs. One skilled in the art will recognize that a CPU with multiple cores may operate similar to multiple CPUs with each core acting as a CPU. Therefore, when referring to one or CPUs, a CPU core may be considered to be the operating equivalent of a CPU for purposes of the calculations of the plurality of discrete independent portions of the complex test waveform. In the embodiment shown in FIG. 2, a pre-existing waveform is provided for the base form (i.e., raw form) of the data signal of the emulated computer storage media device. Thus, in the embodiment shown in FIG. 2, the complex test waveform is based on a pre-existing waveform that is modified/altered by the applicable compute resources (i.e., GPUs and, optionally, CPUs or other available computation resources).

At step 206, the plurality of calculated (from step 204 above) discrete individual portions of the complex test waveform are combined together along with the provided pre-existing base data waveform in order to generate a complete complex test waveform that incorporates all of the characteristics, aspects, features, etc. of the plurality of discrete individual portions of the complex test waveform. As with the calculation of the plurality of discrete individual portions of the complex test waveform, the combination of the plurality of calculated discrete individual portions of the complex test waveform is performed in parallel, in real-time, and continuously by the GPUs using the parallel processing features available on typical GPUs. Again any additional available compute resources, such as CPUs, may also be used to enhance the available parallel processing of the GPUs, with the computer resources being assigned calculable algorithms as may best suit the particular calculation at hand (see also the disclosure with respect to FIGS. 3 and 4 below).

At step 208, the complete complex test waveform from step 206 is applied to one or more test devices. The one or more test devices may include any internal or external device, subsystem, circuit, etc. that is intended to interact with the emulated computer media device. The real-time, continuous, complete complex test waveform permits the one or more test devices to be tested in real-time and continuously using an emulated waveform of the operation of the computer storage media device that closely represents the actual operation of the computer storage media device. Thus, the test devices may be tested in situations that closely approximate actual operating conditions (i.e., not simplified or ideal conditions) without the need to have the actual computer storage media device present.

Figure 3:
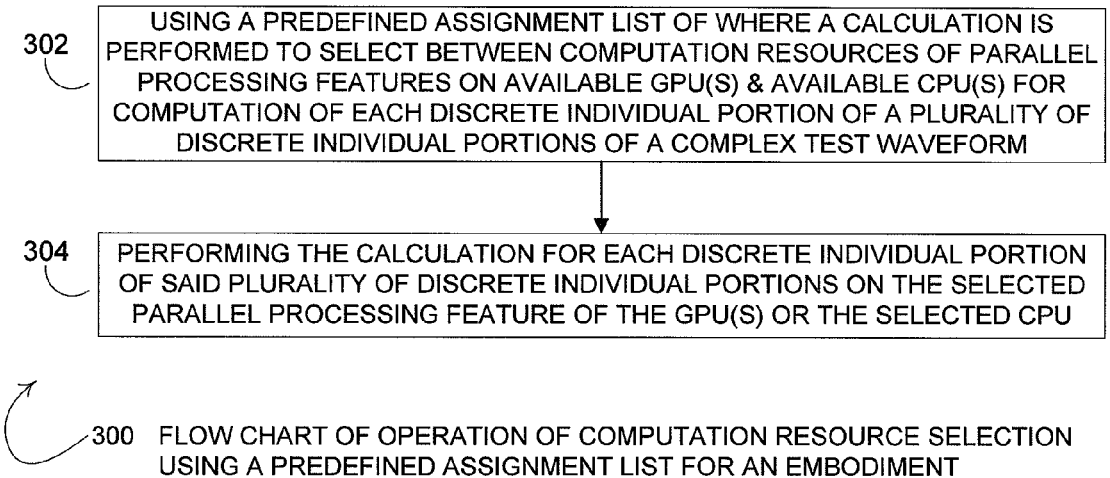
FIG. 3 is a flow chart of the operation of computation resource selection using a predefined assignment list for an embodiment.

FIG. 3 is a flow chart 300 of the operation of computation resource selection using a predefined assignment list for an embodiment. At step 302, a predefined assignment list is used to code where a calculation is performed into the calculable algorithms. The predefined list selects which computation resource (i.e., the parallel processing features on the GPUs and/or, if available, the one or more CPUs) will be assigned to calculate particular calculable algorithms of the plurality of discrete individual portions of the complex test waveform. At step 304, the calculation for each discrete individual portion of said plurality of discrete individual portions of the complex test waveform are performed on the processing element assigned in the predefined assignment list.

Figure 4:
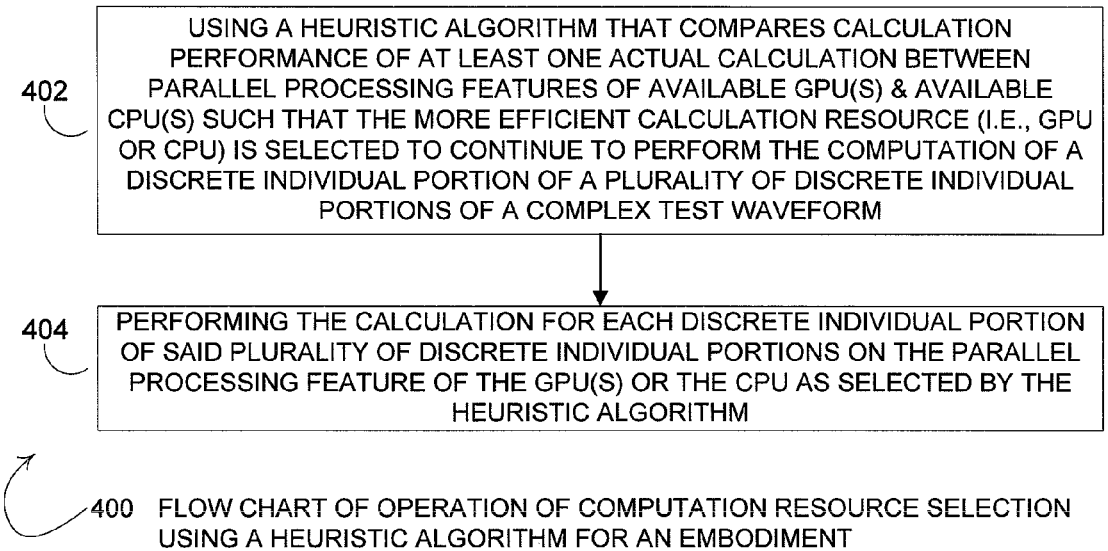
FIG. 4 is a flow chart of the operation of computation resource selection using a heuristic algorithm for an embodiment.

FIG. 4 is a flow chart 400 of the operation of computation resource selection using a heuristic algorithm for an embodiment. At step 402, a heuristic algorithm is used to determine which available processing element (i.e., the parallel processing features on the GPUs and/or, if available, one or more CPUs) performs particular calculations most efficiently. The heuristic algorithm may perform each calculation once on each processing element (i.e., the parallel processing features on the GPUs and/or, if available, one or more CPUs) and select the processing element that performs the calculation most efficiently to perform the calculation during normal operation. Thus, the heuristic algorithm for computation resource selection may permit more efficient operation since the processing element and calculation combination is tested and selected based on calculation efficiency. Further, using a heuristic algorithm to select processors for calculations does not require that the number and/or type of processing elements be known in advance and/or coded into the calculable algorithms. Thus, for the heuristic computation resource selection algorithm, the number and type of processing elements may be adjusted based on the amount of actual work, generation, and/or transformation necessary for real-time waveform generation and output. At step 404, the calculation for each discrete individual portion of said plurality of discrete individual portions of the complex test waveform are performed on the processing element assigned by the heuristic assignment algorithm.

Figure 5:
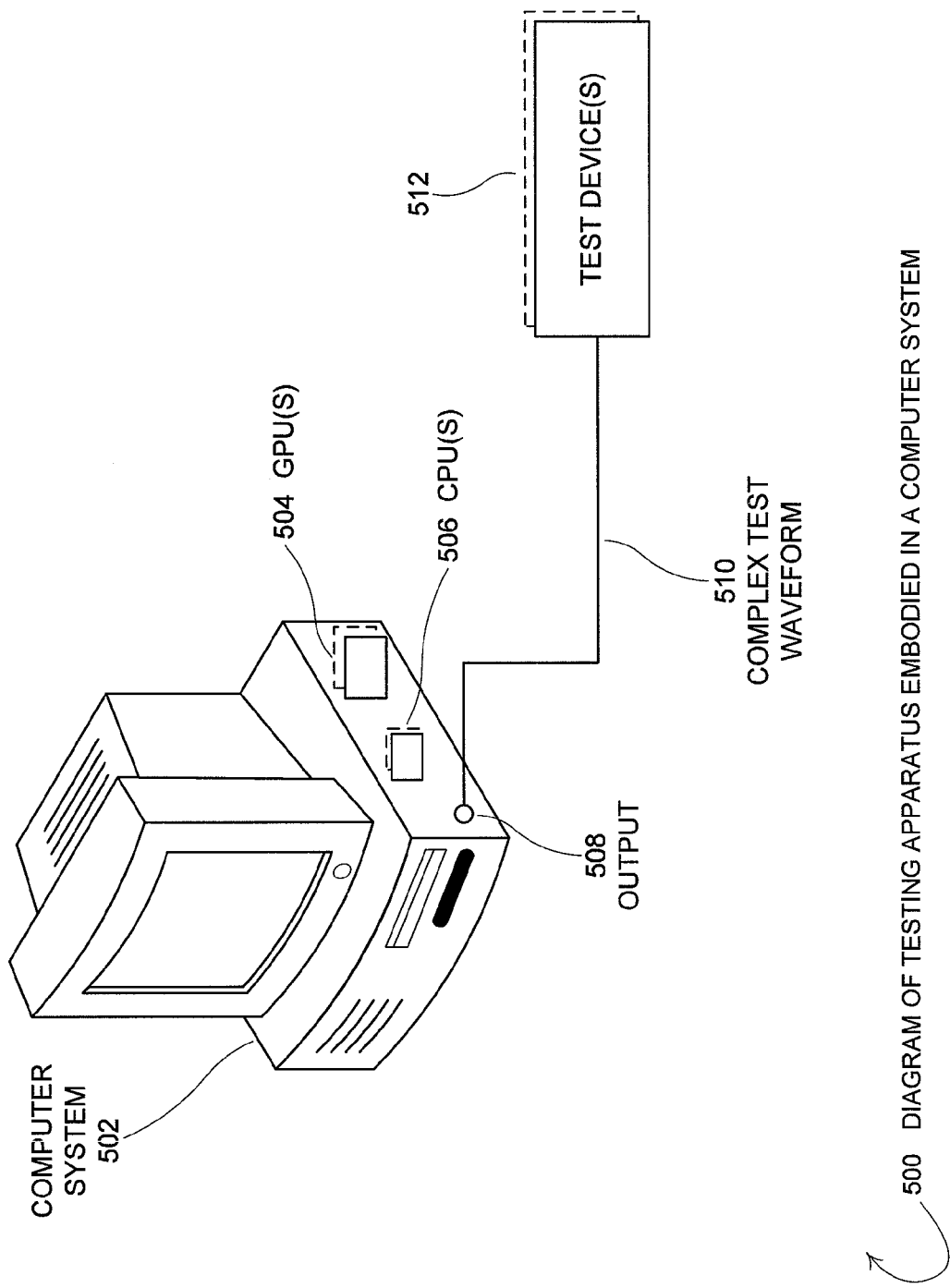
FIG. 5 is a schematic illustration of an embodiment of a testing apparatus as embodied on a computer system.

FIG. 5 is a schematic illustration 500 of an embodiment of a testing apparatus as embodied on a computer system. In the embodiment shown in FIG. 5, there is a computer system 502 that has at least one GPU 504 with associated memory and at least one CPU 506 with associated memory. The GPUs 504 and CPUs 506 of the computer system 502 may be used to perform the calculable algorithms of the plurality of individual discrete portions of the complex test waveform and the combination of the plurality of individual discrete portions that generates the complete complex test waveform 510. The complete complex test waveform 510 is sent via an output 508 of the computer system to one or more test devices 512.

Various embodiments may have varying numbers of GPUs 504, but should have at least one GPU 504. While a standard computer system 502 typically has at least one CPU 506, for the purposes of the calculation of the waveform, the one or more CPUs 506 may not be available for use in calculating the waveform. Further, an embodiment based on dedicated physical hardware may not require a CPU 506 be present since only one GPU 504 is required to implement an embodiment. Accordingly, it should be noted that the computer system 502 illustrated in FIG. 5 represents only one embodiment and that other embodiments may be implemented using one or a combination of dedicated computing hardware, general purpose computers, and/or any other computation resources having at least one GPU.

A particular example of the embodiment shown in FIG. 5 may be comprised of a modern Personal Computer (PC) 502 having an NVIDIA graphics card (GPUs) 504. The main computer system 502 may have a four-core CPU (506) with eight GB of Random Access Memory (RAM) on the motherboard. The graphics card may have two GPU chips (504) and graphic card RAM of two GB. Each of the GPU chips 504 may have two-hundred-forty "processors," which are grouped together into thirty "multiprocessors," yielding a total of four-hundred-eighty processing elements that may perform an algorithm to produce and/or modify a waveform. Different algorithms may be performed on each of the "multiprocessors" for a total of sixty different algorithms being performed at once.

Figure 6:
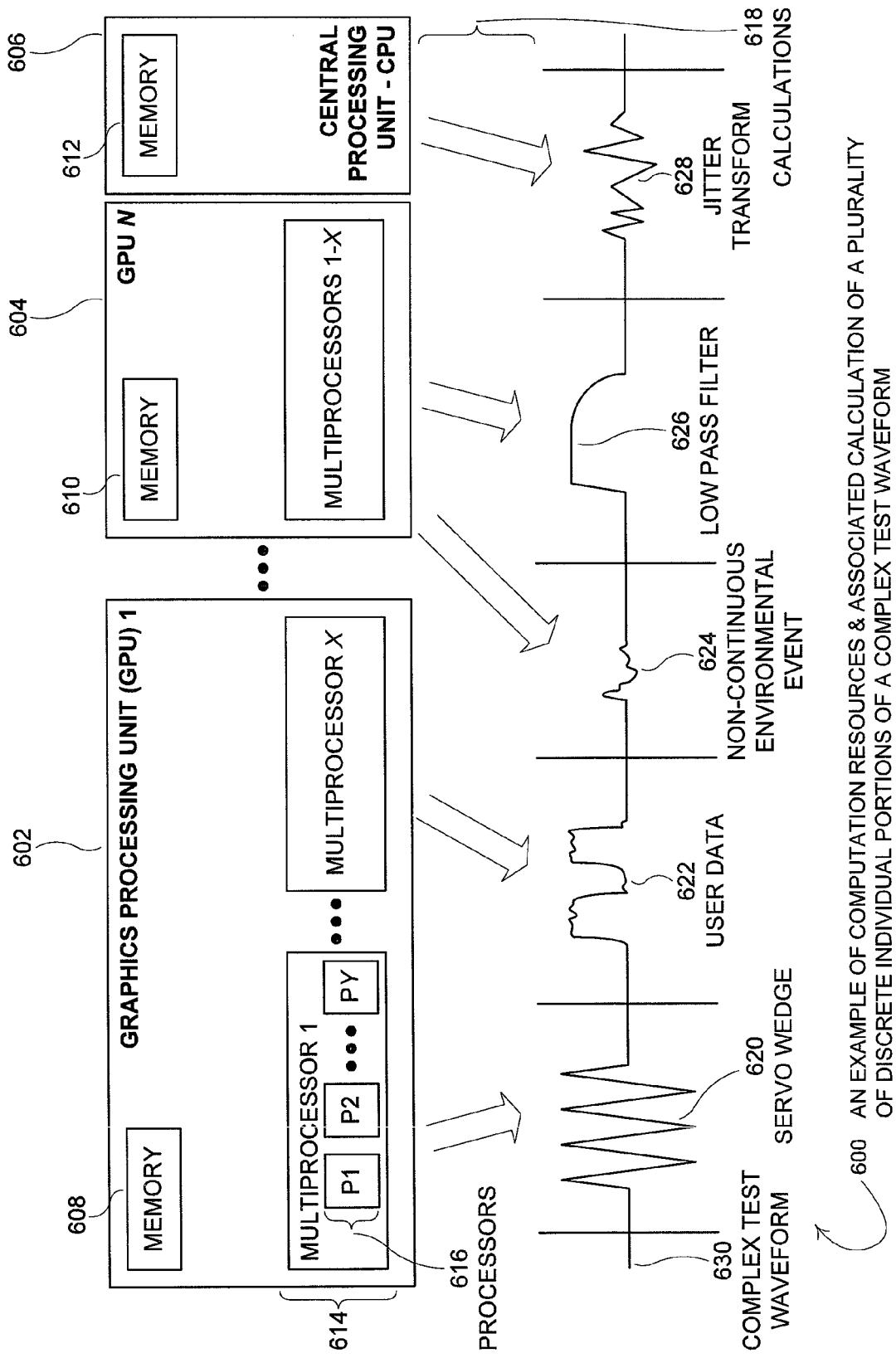
FIG. 6 is a schematic illustration of an example of available computation resources and the associated calculation of a plurality of discrete individual portions of a complex test waveform for an embodiment.

FIG. 6 is a schematic illustration 600 of an example of available computation resources and the associated calculation of a plurality of discrete individual portions of a complex test waveform 630 for an embodiment. In the embodiment shown in FIG. 6, there are one (602) to N (604) GPUs and a single CPU (606) available. Each GPU 602, 604 has an associated memory 608 and 610, respectively. Likewise, the CPU has associated memory 612. Each GPU (602, 604) has X multiprocessors 614 with each multiprocessor 614 made up of Y processors 616. In the embodiment shown in FIG. 6, the GPUs 602, 604 have the same number of multiprocessors 614 and processors 616, but other embodiments may use GPUs of differing sizes (i.e., have different numbers of multiprocessors 614 and/or processors 616). In the embodiment shown in FIG. 6, a multiprocessor 616 on GPU 1 (602) calculates 618 the discrete individual portion for the contribution of a servo wedge 620 to the complex test waveform 630. Another multiprocessor 616 on GPU 1 (602) calculates 618 the discrete individual portion for the contribution of user data 622 from the computer storage media device to the complex test waveform 630. A multiprocessor 616 on GPU N (604) calculates 618 the discrete individual portion for the contribution of a non-continuous environmental event 624 to the complex test waveform 630. Another multiprocessor 616 on GPU N (604) calculates 618 the discrete individual portion for the contribution of a low pass filter 626 to the complex test waveform 630. The CPU 606 calculates 618 the discrete individual portion for the contribution of a jitter transform 628 to the complex test waveform 630. The calculations for the contributions from the servo wedge 620, user data 622, the non-continuous environmental event 624, the low pass filter 626, and jitter transform 628 are performed in parallel by the GPUs 602, 604 and the CPU 606 and are combined to generate the complete complex test waveform 630. The embodiment shown in FIG. 6 is only one example of an embodiment. One skilled in the art will recognize that many embodiments are possible and that the choice of implementation of an embodiment may change with the expected complexity of waveform calculations and with the physical hardware available to a system designer.

Various embodiments may provide the control and management functions detailed herein via an application operating on a computer system (or other electronic devices). Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method to test, in real-time, at least one test device that is a device intended to interact with a computer storage media device comprising:
   calculating, in real-time and continuously, a plurality of discrete individual portions of a complex test waveform using parallel processing features of at least one Graphics Processing Unit (GPU) such that each discrete individual portion of said plurality of discrete individual portions is calculated in parallel by said at least one GPU, each calculation of each discrete individual portion of said plurality of individual portions being based on a calculable algorithm that defines a representation of an effect on a data signal delivered by said computer storage media device;
   combining said plurality of calculated discrete individual portions of said complex test waveform together to generate a complete complex test waveform that emulates operation of said computer storage media in real-time, continuously, and using said parallel processing features of said at least one GPU; and
   applying, in real-time and continuously, said complete complex test waveform to said at least one test device in order to test operation of said at least one test device when said at least one test device interacts with said complete complex test waveform that emulates said computer storage media device.

2. The method of claim 1 wherein at least one discrete individual portion of said plurality of discrete individual portions of said complex test waveform has at least one adjustable parameter that varies results of said at least one discrete individual portion of said plurality of discrete individual portions of said complex test waveform, and said method of claim 1 further comprises adjusting said at least one adjustable parameter in real-time such that said complete complex test waveform emulating said computer storage media device changes in accord with said at least one adjustable parameter.

3. The method of claim 2 wherein said adjustments to said at least one adjustable parameter are performed automatically.

4. The method of claim 2 wherein said adjustments to said at least one adjustable parameter are arbitrary and random.

5. The method of claim 1 wherein at least one discrete individual portion of said plurality of discrete individual portions is calculated to be representative of a base data signal delivered by said computer storage media device.

6. The method of claim 1 wherein said step of combining said plurality of calculated discrete individual portions of said complex test waveform together to generate said complete complex test waveform further comprises combining a pre-existing waveform representative of a base data signal of said computer storage media device with said plurality of discrete individual portions of said complex waveform such that said complete complex test waveform is said pre-existing waveform modified by combination with said plurality of calculated discrete individual portions of said complex test waveform.

7. The method of claim 1 wherein said at least one test device is one of a group comprising: said computer storage device controller, said computer storage device writer, said computer storage device reader, said computer storage device functional blocks, an external device interacting with said computer storage device, and a subsystem of said external device interacting with said computer storage device.

8. The method of claim 1 wherein said discrete individual portions of said plurality of discrete individual portions of said complex test waveform are comprised of at least one continuous waveform portion and at least one non-continuous signal portion.

9. The method of claim 1 wherein said complete complex test waveform emulates a waveform as said waveform would appear when sampled from at least one location in a path of signal propagation for data delivered from said computer storage device.

10. The method of claim 1 further comprising:
    providing at least one Central Processing Unit (CPU) that is available to perform calculations of said calculable algorithms of said plurality of discrete individual portions of said complex test waveform;
    selecting between said parallel processing features of said at least one GPU and said at least one CPU to perform calculations for each of said plurality of discrete individual portions of said complex test waveform such that said calculations are performed continuously, in parallel, and in real-time; and
    performing calculations for each discrete individual portion of said plurality of discrete individual portions of said complex test waveform on said at least one GPU and said at least one CPU as selected for each discrete individual portion of said plurality of discrete individual portions of said complex test waveform.

11. The method of claim 10 wherein said selecting between said parallel processing features of said at least one GPU and said at least one CPU to perform said calculations is based on a predefined assignment list that defines where a calculation is performed.

12. The method of claim 10 wherein said selecting between said parallel processing features of said at least one GPU and said at least one CPU to perform said calculations is based on a heuristic algorithm that selects where a calculation is performed based on a comparison of calculation performance between said parallel processing features of said at least one GPU and said at least one CPU.

13. The method of claim 1 further comprising generating said calculable algorithm that defines a representation of an effect on said data signal delivered by said computer storage media device for each discrete portion of said plurality of discrete portions of said complex test waveform.

14. The method of claim 1 wherein said calculable algorithms that define said representations of said effects on said data signal delivered by said computer storage media device are each at least one of a group comprising: an Arbitrary Waveform Generation (AWG) algorithm, a transform algorithm, a lookup table algorithm, an analog signal generation algorithm, digital signal generation algorithm, a filter algorithm, and a mathematical function algorithm.

15. A test apparatus for testing, in real-time, at least one device that is intended to interact with a computer storage media device comprising:
- at least one Graphics Processing Unit (GPU) that has parallel processing features;
- a calculation subsystem that calculates, in real-time and continuously, a plurality of discrete individual portions of a complex test waveform using said parallel processing features of said at least one GPU such that each discrete individual portion of said plurality of discrete individual portions is calculated in parallel by said at least one GPU, each calculation of each discrete individual portion of said plurality of individual portions being based on a calculable algorithm that defines a representation of an effect on a data signal delivered by said computer storage media device;
- a complex test waveform generation subsystem that combines said plurality of calculated discrete individual portions of said complex test waveform together to generate a complete complex test waveform that emulates operation of said computer storage media in real-time, continuously, and using said parallel processing features of said at least one GPU; and
- a complex test waveform output that outputs said complete complex test waveform for application, in real-time and continuously, to said at least one test device in order to test operation of said at least one test device when said at least one test device interacts with said complete complex test waveform that emulates said computer storage media device.

16. The test apparatus of claim 15 wherein at least one discrete individual portion of said plurality of discrete individual portions of said complex test waveform has at least one adjustable parameter that varies results of said at least one discrete individual portion of said plurality of discrete individual portions of said complex test waveform, and said test apparatus of claim 16 further comprises a parameter adjustment subsystem that adjusts said at least one adjustable parameter in real-time such that said complete complex test waveform emulating said computer storage media device changes in accord with said at least one adjustable parameter.

17. The test apparatus of claim 15 wherein said discrete individual portions of said plurality of discrete individual portions of said complex test waveform are comprised of at least one continuous waveform portion and at least one non-continuous waveform portion.

18. The test apparatus of claim 15 further comprising:
- at least one Central Processing Unit (CPU) that is available to perform calculations of said calculable algorithms of said plurality of discrete individual portions of said complex test waveform; and
- a processor selection subsystem that selects between said parallel processing features of said at least one GPU and said at least one CPU to perform calculations for each of said plurality of discrete individual portions of said complex test waveform such that said calculations are performed continuously, in parallel, and in real-time for each discrete individual portion of said plurality of discrete individual portions of said complex test waveform on said at least one GPU and said at least one CPU as selected for each discrete individual portion of said plurality of discrete individual portions of said complex test waveform.

19. The test apparatus of claim 15 wherein at least one discrete individual portion of said plurality of discrete individual portions is calculated to be representative of a base data signal delivered by said computer storage media device.

20. The test apparatus of claim 15 wherein said complex test waveform generation subsystem further comprises combining a pre-existing waveform representative of a base data signal of said computer storage media device with said plurality of calculated discrete individual portions of said complex waveform such that said complete complex text waveform is said pre-existing waveform modified by combination with said plurality of calculated discrete individual portions of said complex test waveform.

* * * * *